(12) United States Patent
Konshak et al.

(10) Patent No.: US 6,801,834 B1
(45) Date of Patent: Oct. 5, 2004

(54) DATA LIBRARY SYSTEM HAVING MOVABLE ROBOTIC LIBRARIAN OPERABLE FOR ACCESSING STATICALLY MOUNTED DRIVES

(75) Inventors: Michael V. Konshak, Louisville, CO (US); Donald E. Auten, North Glenn, CO (US)

(73) Assignee: Storage Technology Corporation, Louisville, CO (US)

( * ) Notice: Subject to any disclaimer, the term of this patent is extended or adjusted under 35 U.S.C. 154(b) by 22 days.

(21) Appl. No.: 10/357,953

(22) Filed: Feb. 4, 2003

(51) Int. Cl.[7] .............................................. G06F 19/00
(52) U.S. Cl. ...................... 700/245; 700/211; 700/212; 700/213; 700/214; 700/218; 710/315; 710/316; 710/106; 710/107; 414/273
(58) Field of Search ................................ 700/245, 218, 700/211–214; 710/315, 316, 106, 107; 360/69, 92, 99.06; 369/30.4, 30.3, 192, 92; 711/111, 112; 235/375; 713/1; 414/273

(56) References Cited

U.S. PATENT DOCUMENTS

| | | | |
|---|---|---|---|
| 5,456,528 A | * 10/1995 | Dalziel ....................... 312/9.46 |
| 5,548,521 A | * 8/1996 | Krayer et al. ................. 700/214 |
| 5,607,275 A | * 3/1997 | Woodruff et al. ......... 414/331.05 |
| 5,718,339 A | * 2/1998 | Woodruff .................. 211/41.12 |
| 6,072,766 A | 6/2000 | Konshak |
| 6,282,678 B1 | * 8/2001 | Snay et al. .................. 714/712 |
| 6,353,581 B1 | * 3/2002 | Offerman et al. .......... 369/30.4 |
| 6,471,308 B1 | 10/2002 | Konshak et al. |
| 6,496,325 B1 | * 12/2002 | Kersey et al. ................ 360/92 |
| 6,498,723 B1 | 12/2002 | Konshak et al. |
| 6,535,790 B2 | * 3/2003 | Nakano et al. .............. 700/214 |
| 6,537,013 B2 | * 3/2003 | Emberty et al. ............. 414/280 |
| 2002/0101676 A1 | * 8/2002 | Ellis ............................ 360/69 |
| 2002/0159183 A1 | * 10/2002 | Albrecht et al. .............. 360/69 |
| 2003/0065684 A1 | * 4/2003 | Goodman et al. .......... 707/200 |
| 2003/0123341 A1 | * 7/2003 | Ostwald et al. .......... 369/30.43 |

OTHER PUBLICATIONS

Butturini, Performance simulation of a high capacity optical disk system, IEEE Symposium on , Oct. 31–Nov. 3, 1988, pp. 147–153.*
Quantum ATL, Quantum| ATL 7100 Series Library (Operator's Guide) 1997, 1–62.*
Storagetek, L180 Tape Library, 1999, Internet, pp. 1–A9.*
ADIC, AMML/2, automated mixed media library, 2000, Internet, pp. 1–6.*

* cited by examiner

*Primary Examiner*—Thomas G. Black
*Assistant Examiner*—McDieunel Marc
(74) *Attorney, Agent, or Firm*—Brooks Kushman P.C.

(57) ABSTRACT

An automated data library system includes a data library housing drive clusters. The drive clusters include drive arrays of disk drives. The drive clusters are statically mounted within the data library and are not powered when not in use. The system includes a robotic librarian operable for moving about the data library to locate, engage, and access a desired drive cluster. The robotic librarian includes its own power source for providing power to the desired drive cluster in order to enable operation of the desired drive cluster. The robotic librarian further includes a cooling device for cooling off desired drive cluster while the drive cluster is operating. The robotic librarian further includes a writer and a reader for writing data to and reading data from the disk drives of the desired drive cluster using the connection while the desired drive cluster is operating.

13 Claims, 4 Drawing Sheets

DATA LIBRARY SYSTEM HAVING MOVABLE ROBOTIC LIBRARIAN OPERABLE FOR ACCESSING STATICALLY MOUNTED DRIVES

BACKGROUND OF THE INVENTION

1. Field of the Invention

The present invention relates generally to automated data storage library methods and systems and, more particularly, to a data library system having a movable robotic librarian provided with a writer/reader in order to write/read data to and from drives statically mounted in a data library.

2. Background Art

A data library system includes a data library having racks and shelves of storage devices. The storage devices include disk drives, tape drives, and the like which store data. A host server or the like is operable with the storage devices to write data to and read data from the storage devices.

The storage devices may be grouped together in arrays. For instance, a fixed drive array may include two or more disk drives grouped together. The disk drives plug into a backplane of the fixed drive array. The fixed drive array includes its own power system for providing power to the disk drives in order to enable the disk drives to be operable. The fixed drive array also includes its own cooling system for cooling the disk drives during operation. The fixed drive array further includes its own writer and reader. The writer enables an external device such as the host server to write data to the disk drives via the backplane. Similarly, the reader enables the host server to read data from the disk drives via the backplane. Both the writer and reader are typically hardwired with cable or the like to an intermediate device such as a hub or router which is connected directly to the host server.

Many such fixed drive arrays may be arranged on the racks and shelves of the data library and fixed in position within a certain area of the data library as the drive arrays are not intended to be moved. Each fixed drive array is a self-contained device having its own delegated power and cooling systems and having its own cable connection from the writer and the reader for data communications with an external device such as a host server. A problem with this configuration of fixed drive arrays in a data library is that for on-line operation, the power and cooling requirements are extensive as each fixed drive array is being powered and cooled regardless of whether it is being write or read accessed by the host server. Further, the architecture of all of the data communications connections between the fixed drive arrays and the intermediate device is complicated and burdensome because the number of fixed drive arrays in the data library is typically extremely large.

In order to avoid some of the problems associated with the fixed drive array configuration, the drive arrays may be arranged to not have their own power and cooling systems and not have their own writer and reader. In this arrangement, each of the exemplary drive arrays is essentially only two or more disk drives plugged into a backplane. The drive arrays are arranged on the racks and shelves of the data library. However, unlike the fixed drive array configuration, the drive arrays are not fixed within the data library and may be removed from the data library for transport by a robotic librarian. The robot removes and transfers a drive array from the data library to a module having a writer and a reader and its own power and cooling systems.

Upon receiving the drive array from the robot, the module provides power to the drive array to make the drive array operable and cools the drive array during operation. The module then writes data to or reads data from the disk drives of the drive array. Once the writing and reading operations are finished, the robot takes the drive array from the module and transports the drive array back into its position within the data library.

A problem with this arrangement of the data library system in which a robot transports drive arrays from the data library to a module having a writer/reader and delegated power and cooling systems is that the drive arrays experience wear and tear due to multiple transport excursions to the module. Accordingly, the operational lives of the drive arrays may terminate prematurely. Further, each drive array typically weighs a relatively large amount. As such, the robot used for transporting the drive arrays must be robust and, as a result, is typically expensive.

SUMMARY OF THE INVENTION

Accordingly, it is an object of the present invention to provide a data library system having a robotic librarian operable for moving about a data library and operable for accessing statically mounted drives in the data library.

Further, it is an object of the present invention to provide a data library system having a movable robotic librarian provided with a communications device such as a writer/reader in order to write/read data to and from drives statically mounted in a data library.

Also, it is an object of the present invention to provide a data library system having a robot operable for moving about a data library and being provided with a communications device and a power system for providing power to a drive array statically mounted in the data library to make the drive array operable while writing/reading data to and from the drives of the drive array.

It is also an object of the present invention to provide a data library system having a data library with un-powered drives statically arranged therein and a self-propelled robotic librarian having at least one of a writer and a reader, and a power source in which the robotic librarian moves about the data library for engaging a drive in order to provide power to the drive to enable operation of the drive and write/read data to and from the drive during its operation.

It is a further object of the present invention to provide a data library system having a data library with un-powered and un-cooled drives statically arranged therein and a self-propelled robotic librarian having at least one of a writer and a reader, a power source, and a cooling device in which the robotic librarian moves about the data library for engaging a drive in order to provide power to the drive to enable operation of the drive and write/read data to and from the drive while cooling off the drive during operation.

In carrying out the above objects and other objects, the present invention provides an automated data library system. The system includes a data library having a housing. Drive clusters are statically mounted within respective areas of the housing of the data library. A robotic librarian is operable for moving about the data library to locate a desired drive cluster. The robotic librarian has a reader for reading data stored on a drive cluster and a power source for providing power to a drive cluster to enable operation of the drive cluster. The robotic librarian is further operable for making a connection with the desired drive cluster. The robotic librarian transfers power from the power source to the desired drive cluster via the connection for enabling operation of the desired drive cluster. The robotic librarian reads data stored on the desired drive cluster with the reader via the connection while operation of the desired drive cluster is enabled. The connection between the robotic librarian and the desired drive cluster may be an umbilical or wireless connection.

The robotic librarian may further include a cooling device for supplying air to cool off a drive cluster while operation of the drive cluster is enabled. The robotic librarian supplies air from the cooling device to the desired drive cluster via the connection.

The drive clusters may each include a data communications port. In this instance, the connection between the robotic librarian and the desired drive cluster includes a connection between the robotic librarian and the data communications port of the desired drive cluster in order to enable the reader of the robotic librarian to read data stored on the desired drive cluster.

The drive clusters may each include a power port. In this instance, the connection between the robotic librarian and the desired drive cluster includes a connection between the robotic librarian and the power port of the desired drive cluster in order to enable the power source of the robotic librarian to provide power to the desired drive cluster.

The drive clusters may each include a port and the robotic librarian may include an arm. In this instance, the port of the desired drive cluster receives the arm of the robotic librarian in order for the robotic librarian to make the connection with the desired drive cluster.

The data library may include cabinets arranged in a book-shelf or silo configuration. In these instances, the drive clusters are statically mounted within the cabinets of the data library. Each drive cluster includes at least one drive array with each drive array includes at least one drive. Each drive may be a disk drive or a tape drive.

Further, in carrying out the above objects and other objects, the present invention provides another automated data library system. This system includes a data library having un-powered cabinets within a housing. Drive clusters are statically mounted within respective areas of the cabinets in the housing of the data library.

This system further includes a robotic librarian operable for moving about the data library to locate a desired drive cluster. The robotic librarian has at least one of a writer and a reader. The writer is operable for writing data to a drive cluster and the reader is operable for reading data to a drive cluster. The robotic librarian further has a power source for providing power to a drive cluster to enable operation of the drive cluster. The robotic librarian is further operable for physically engaging the desired drive cluster. The robotic librarian transfers power from the power source to the desired drive cluster via the physical engagement for enabling operation of the desired drive cluster. The robotic librarian uses the writer to write data to the desired drive cluster over the physical connection while the desired drive cluster is powered. Similarly, the robotic librarian uses the reader to read data from the desired drive cluster over the physical connection while the desired drive cluster is powered.

The cabinets of the data library are uncooled and un-heated. In this instance, the robotic librarian further includes a cooling device such as a fan or blower for supplying air to cool off a drive cluster while operation of the drive cluster is powered. The robotic librarian supplies air from the cooling device to the desired drive cluster while the desired drive cluster is powered.

The drive clusters may each include a data communications port and a power port. In this instance, the physical engagement between the robotic librarian and the desired drive cluster includes a connection between the robotic librarian and the data communications port of the desired drive cluster to enable writing data to and reading data from the desired drive cluster, and a connection between the robotic librarian and the power port of the desired drive cluster in order to enable the power source of the robotic librarian to provide power to the desired drive cluster.

The drive clusters may each further include a receiving canal with the robotic librarian including an arm. In this instance, the receiving canal of the desired drive cluster receives the arm of the robotic librarian in order for the robotic librarian to connect with the data communications port and the power port of the desired drive cluster.

The advantages accruing to the present invention are numerous. For instance, the present invention allows the use of robotic handling components of relatively small size and increased speed because of the minimal weight required by moving and making the connection between the robot and the drive clusters as opposed to the large weight of the drive clusters incurred when the drive clusters are moved.

DETAILED-DESCRIPTION OF THE PREFERRED EMBODIMENT(S)

Figure 1:
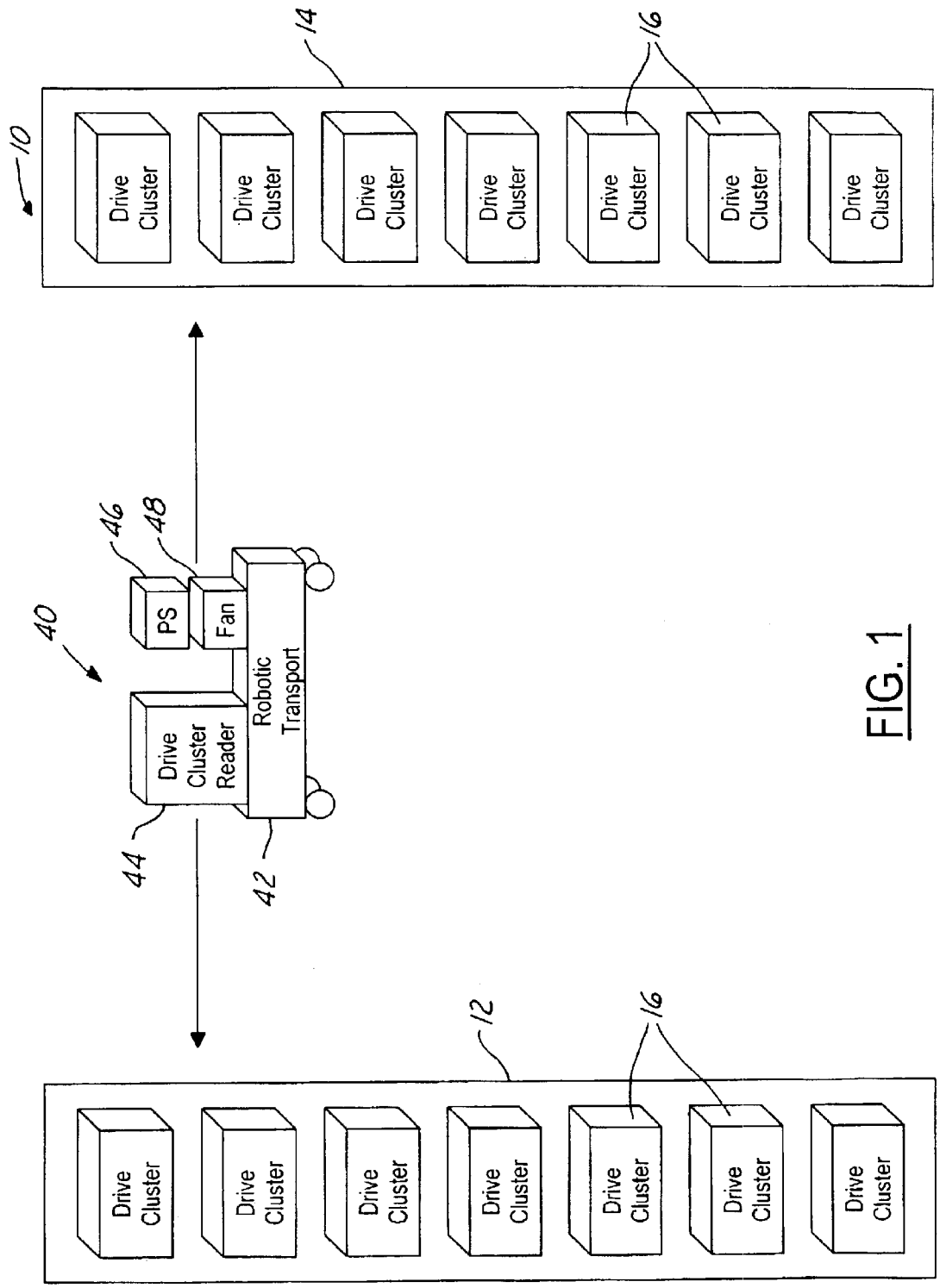
FIG. 1 illustrates a block diagram of an automated data library system in accordance with the present invention.

Referring now to FIG. 1, a block diagram of an automated data library system 10 in accordance with the present invention is shown. Automated data library system 10 includes at least one data library, for instance, two data libraries 12 and 14. Data libraries 12 and 14 each include a housing having racks, shelves, and the like arranged therein. Data libraries 12 and 14 may be arranged proximate to each other within a room or located apart from one another in the same room or in separate rooms. Data libraries 12 and 14 may also be arranged concentrically to each other with data library 12 on the inside and data library 14 on the outside with a space arranged between.

Drive clusters 16 are stacked and arranged on the racks and shelves within the housings of data libraries 12 and 14. Drive clusters 16 are statically mounted within data libraries 12 and 14 as the drive clusters are not intended to be moved or removed from the data libraries during normal operation of system 10. As will be described in detail below, system 10 is arranged such that drive clusters 16 are statically mounted within data libraries 12 and 14 with the writing and reading of data to and from the drive clusters occurring while the drive clusters are statically mounted within data libraries.

Drive clusters 16 generally include storage devices such as magnetic disks (i.e., magnetic disk drives) and magnetic tape (i.e., magnetic tape drives) for storing data. A device external to data libraries 12 and 14 such as a host server may access the storage devices of drive clusters 16 in order to write data to and read data from the storage devices. For simplicity, the storage devices will be referred to as disk drives in this description, but it is to be appreciated that the storage devices may include tape drives or a combination of disk and tape drives.

Figure 2:
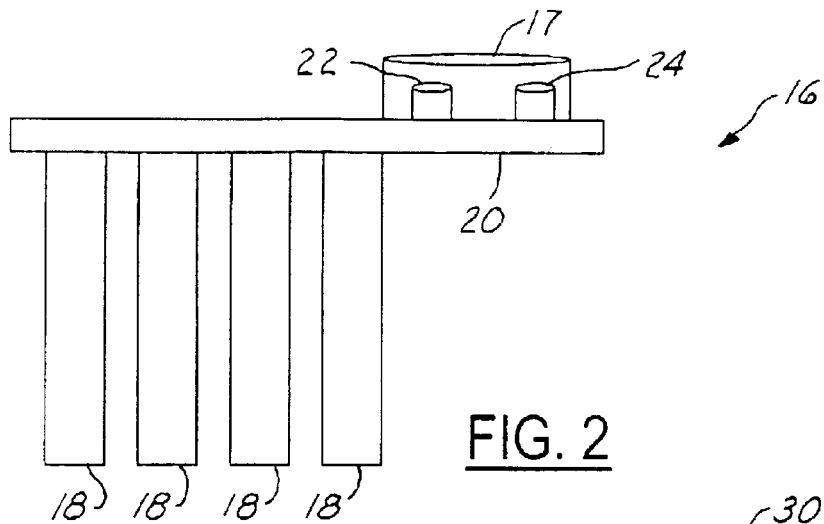
FIG. 2 illustrates a block diagram of a drive cluster in accordance with the present invention.

Referring now to FIG. 2, with continual reference to FIG. 1, a drive cluster 16 is shown. Drive cluster 16 includes one or more drive arrays 18 grouped together in a three dimensional array. For instance, as shown in FIG. 2, drive cluster 16 includes four drive arrays 18. Drive arrays 18 plug into a backplane 20 of drive cluster 16. A data communications port 22 and an electrical power port 24 are connected to backplane 20. Data communications port 22 enables an external device to connect with the data communications port and communicate data to and from each of drive arrays 18 via backplane 20. Power port 24 enables an external device to connect with the power port and provide power to drive arrays 18 via backplane 20 in order to make the drive arrays operational.

In accordance with the present invention, drive clusters 16 do not include their own delegated power or cooling systems. As such, each drive cluster 16 remains un-powered while statically mounted within data libraries 12 and 14 until power is provided to the drive cluster from an external power source via power port 24. Further, each drive cluster 16 remains uncooled regardless of whether power is provided to the drive cluster unless an external cooling device such as a blower cools off the drive cluster.

Further, in accordance with the present invention, drive clusters 16 do not include their own hard wire connection such as cabling from data communications ports 22 of the drive clusters to an external device such as hub, router, host server, or the like. Accordingly, each drive cluster 16 communicates with an external device when a connection such as cabling is connected between data communications port 22 of the drive cluster and the external device. At least part of such a connection may be a wireless connection.

As will be explained in greater detail below, data communications port 22 and power port 24 of a drive cluster 16 are contained within a physical port or canal 17 of the drive cluster. Port 17 is used to enable a physical connection between an external device and data communications and power ports 22 and 24.

Figure 3:
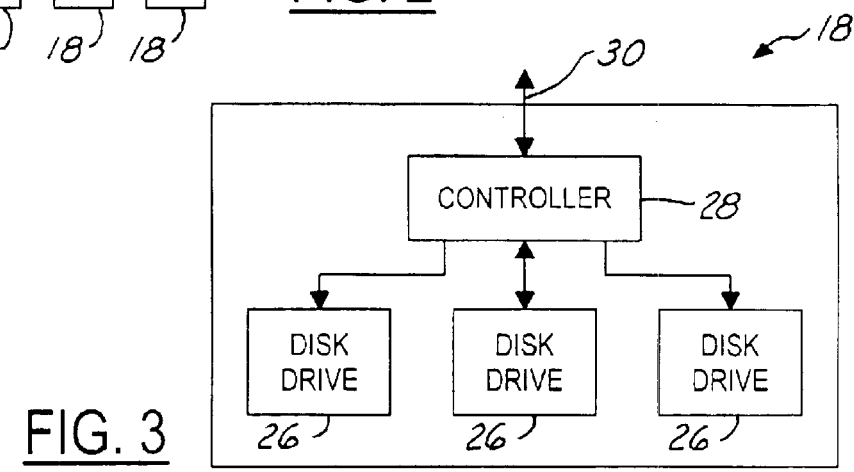
FIG. 3 illustrates a block diagram of a drive array in accordance with the present invention.

Referring now to FIG. 3, with continual reference to FIGS. 1 and 2, a drive array 18 is shown. Drive array 18 includes one or more disk drives 26 grouped together. For example, as shown in FIG. 3, drive array 18 includes three disk drives 26. Drive array 18 further includes a controller 28. Disk drives 26 are individually connected to controller 28. Disk drives 26 and controller 28 are operable to communicate data with one another. Controller 28 is operable to communicate data with an external device such as a host server via backplate 20 and data communications port 22 as indicated by line 30. Controller 28 may be also operable to receive power from an external power source along line 30 via power port 24 and backplate 20 in order to power itself and disk drives 26.

Referring now back to FIG. 1, automated data library system 10 further includes a robotic librarian 40 (i.e., "robot", "robotic mechanism", etc.). Robotic librarian 40 is a self-contained device operable for moving about data libraries 12 and 14 and further operable for accessing drive arrays 18 and disk drives 26 of drive clusters 16 which are statically mounted in the data libraries. In general, robotic librarian 40 is a free roaming or roving device which moves by itself about the surface on which data libraries 12 and 14 are placed on in order to locate a desired drive cluster 16 in the data libraries in response to a command to access the desired drive cluster. Typically, the command is issued by an external device such as a host server which desires to write data to and/or read data from the desired drive cluster.

In this description, accessing a drive cluster 16 means to write data to and/or read data from the drive cluster while the drive cluster is operational. A drive cluster 16 may be operational as long as the drive cluster is powered. Further, a drive cluster 16 may be operational as long as the drive cluster is being cooled off while it is being powered. Cooling of a drive cluster 16 may be required because, in some instances, the drive cluster may become inoperable due to too much heat generated by the drive cluster while it is operational.

Upon locating the desired drive cluster 16, robotic librarian 40 provides power to the desired drive cluster 16 in order to make the desired drive cluster operational. Robotic librarian 40 may also blow air into and/or around drive cluster 16 in order to cool off the drive cluster. Once robotic librarian 40 makes the desired drive cluster 16 operational, the robotic librarian accesses the drive cluster to write and/or read data to and from the desired drive cluster.

Robotic librarian 40 may communicate with the host server while accessing the desired drive cluster 16. For example, robotic librarian 40 may read data from the desired drive cluster 16 and, concurrently or subsequently to the read operation, communicate with the host server to provide the read data to the host server. Similarly, robotic librarian 40 may communicate with the host server to receive the data to be written to the desired drive cluster 16 and, concurrently or subsequently thereto, write the data to the desired drive cluster.

Once the reading and writing operations are completed, robotic librarian 40 disengages with the desired drive cluster 16 and, perhaps, moves back to a home station. Robotic librarian 40 then waits until another command is issued. Once the next command is issued, robotic librarian 40 moves to locate the desired drive cluster 16 which is the subject of the next command.

As shown in FIG. 1, in order to carry out its general functions, robotic librarian 40 includes a movable transport 42, a drive cluster writer/reader 44 (herein "drive cluster reader 44" as labeled in FIG. 1), a power source (PS) 46, and a cooling device such as a fan or blower 48. Drive cluster reader 44, power source 46, and blower 48 are carried and supported by movable transport 42. Movable transport 42 includes wheels or the like in order to move itself and drive cluster reader 44, power source 46, and blower 48 about data libraries 12 and 14.

With continual reference to FIGS. 1 and 2, upon robotic mechanism 40 locating the desired drive cluster 16, power source 46 connects with power port 24 in order to supply power to the desired drive cluster 16. Blower 48 directs air towards the desired drive cluster 16 in order to keep the desired drive cluster cool during its operation. Once the desired drive cluster 16 becomes operational, drive cluster reader 44 connects (either physically or wirelessly) with data communications port 22 in order to read data from drive arrays 18 and disk drives 26 of the desired drive cluster 16 via backplate 20. Drive cluster reader 44 then transmits the read data to the host server (not shown in FIG. 1). Drive cluster reader 44 may transmit the data to the host server using a hard wire connection such as cabling or wirelessly using infrared (IR) or radio-frequency (RF) based communications.

Instead of transmitting the data to the host server, robotic librarian 40 may be configured to include the host server and actually connect the server itself to the desired drive cluster 16. The connection between the desired drive cluster 16 and robotic librarian 40 (or the host server) for power and data transfer may be achieved by using some sort of umbilical connection such as cabling. Of course, the data transfer between desired drive cluster 16 and robotic librarian 40 may also be achieved by using a wireless connection.

Figure 4:
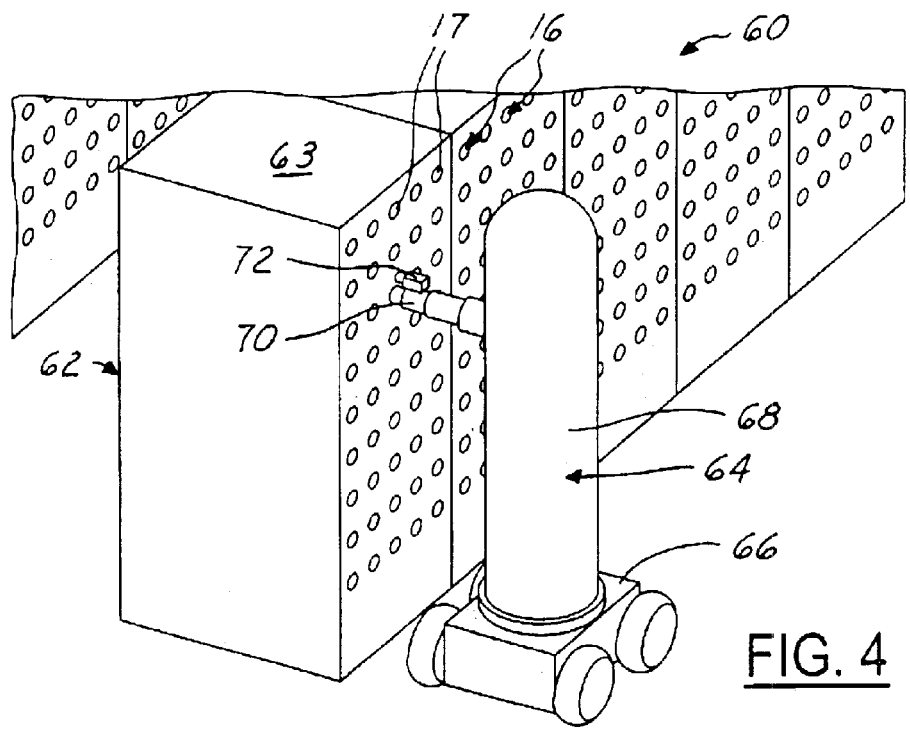
FIG. 4 illustrates a perspective view of a data library and a robotic librarian of an automated data library system in accordance with a first alternate embodiment of the present invention.
Figure 5:
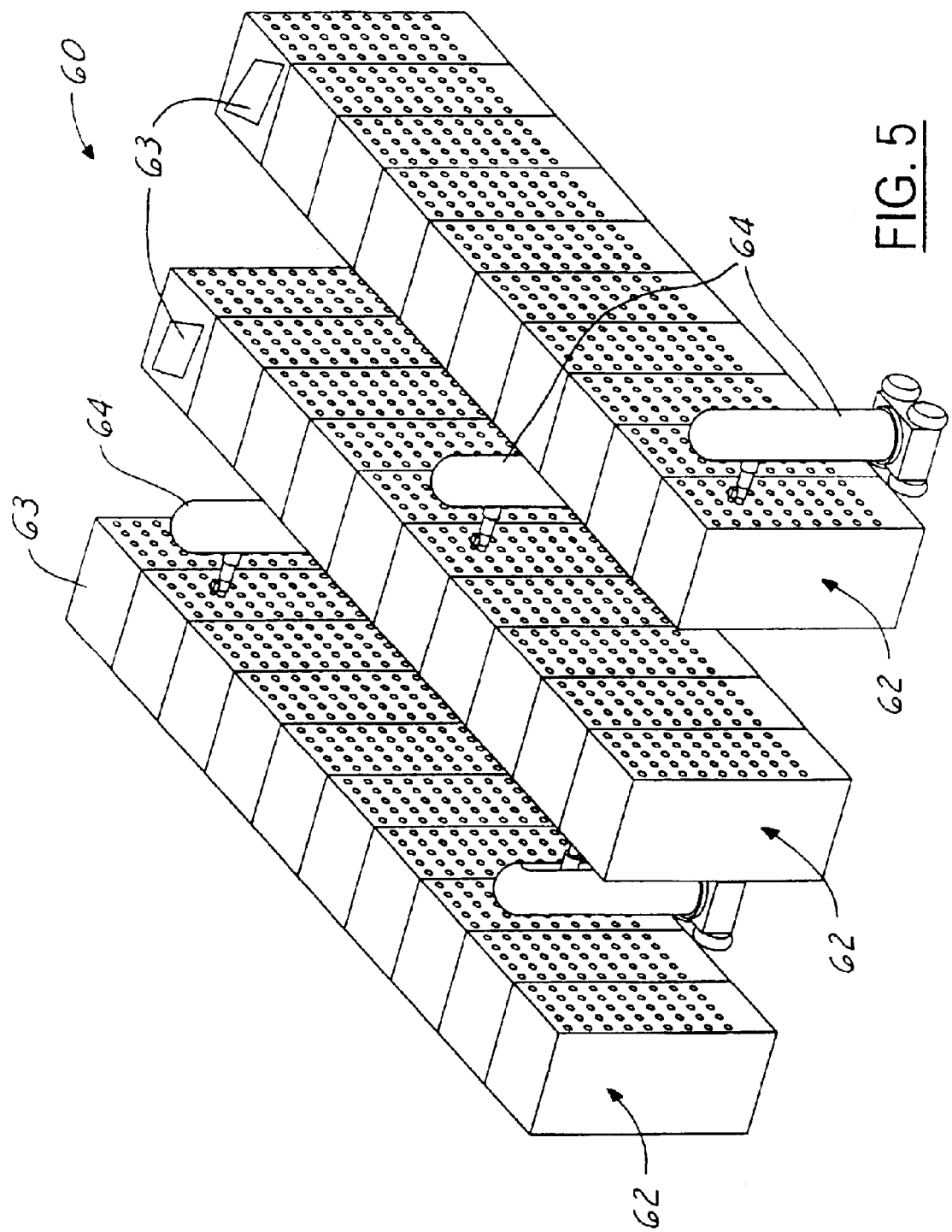
FIG. 5 illustrates a perspective view of the automated data library system shown in FIG. 4.

Referring now to FIGS. 4 and 5, with continual reference to FIG. 1, a perspective view of a data library 62 and a robotic librarian 64 of an automated data library system 60 in accordance with a first alternate embodiment of the present invention are shown. Each data library 62 of automated data library system 60 has a book shelf configuration with un-powered, un-cooled, and un-heated cabinets 63 arranged next to one another. Each data library has two sides with only one side shown in FIGS. 4 and 5.

Drive clusters 16 are statically mounted in a three-dimensional arrangement within cabinets 63 on each side of data libraries 62. Each drive cluster 16 includes a housing having a port 17. Each port 17 is a canal or the like extending within the housing and is operable for receiving a telescoping arm 70 of robotic librarian 64 in order for the robotic librarian to engage and access the associated drive cluster 16. Each port 17 of a drive cluster 16 is in communication with data communications port 22 and power port 24 of the drive cluster. As such, robotic librarian 64 may supply power to a drive cluster 16 via port 17 and power port 24 of the drive cluster. Similarly, robotic librarian 64 may communicate data with a drive cluster 16 via port 17 and data communications port 22 of the drive cluster.

As shown in FIGS. 4 and 5, robotic librarian 64 includes a movable base 66 which supports a main body 68. Movable base 66 includes wheels for moving main body 68 around data libraries. Main body 68 is operable to swivel in a circle about movable base 66 in order to access drive clusters 16. Movable base 66 and/or main body 68 include a power source such as a battery for providing power to drive robotic librarian 64 and to access drive clusters 16.

Telescoping arm 70 of free roving robotic librarian 64 includes a label reader 72. Label reader 72 is used to read labels provided on the housings of drive clusters 16 in order for robotic librarian 64 to locate a desired drive cluster. Arm 70 moves vertically up and down main body 68 in order to enable access of all of drive clusters 16. Arm 70 is operable to swivel about main body 68 to further enable access to drive clusters 16.

Arm 70 extends horizontally to move into and out of a port 17 of a drive cluster 16. Arm 70 extends into port 17 of a drive cluster 16 in order to enable robotic librarian 64 to access the drive cluster. Upon arm 70 engaging port 17 of a drive cluster 16, robotic librarian 64 provides power through the arm to the drive cluster via port 17 and power port 24 of the drive cluster. Robotic librarian 64 may also provide cooling air through arm 70 (for instance, in the case that a portion of arm 70 is hollow) to drive cluster 16 via port 17. Upon drive cluster 16 being powered up, robotic librarian 64 may read data from (or write data to) drive cluster 16 via port 17 and data communications port 22 of the drive cluster. Robotic librarian 64 communicates with a host server using optical or tethered communication means to provide the data read from drive cluster 16 to the host server.

Figure 6:
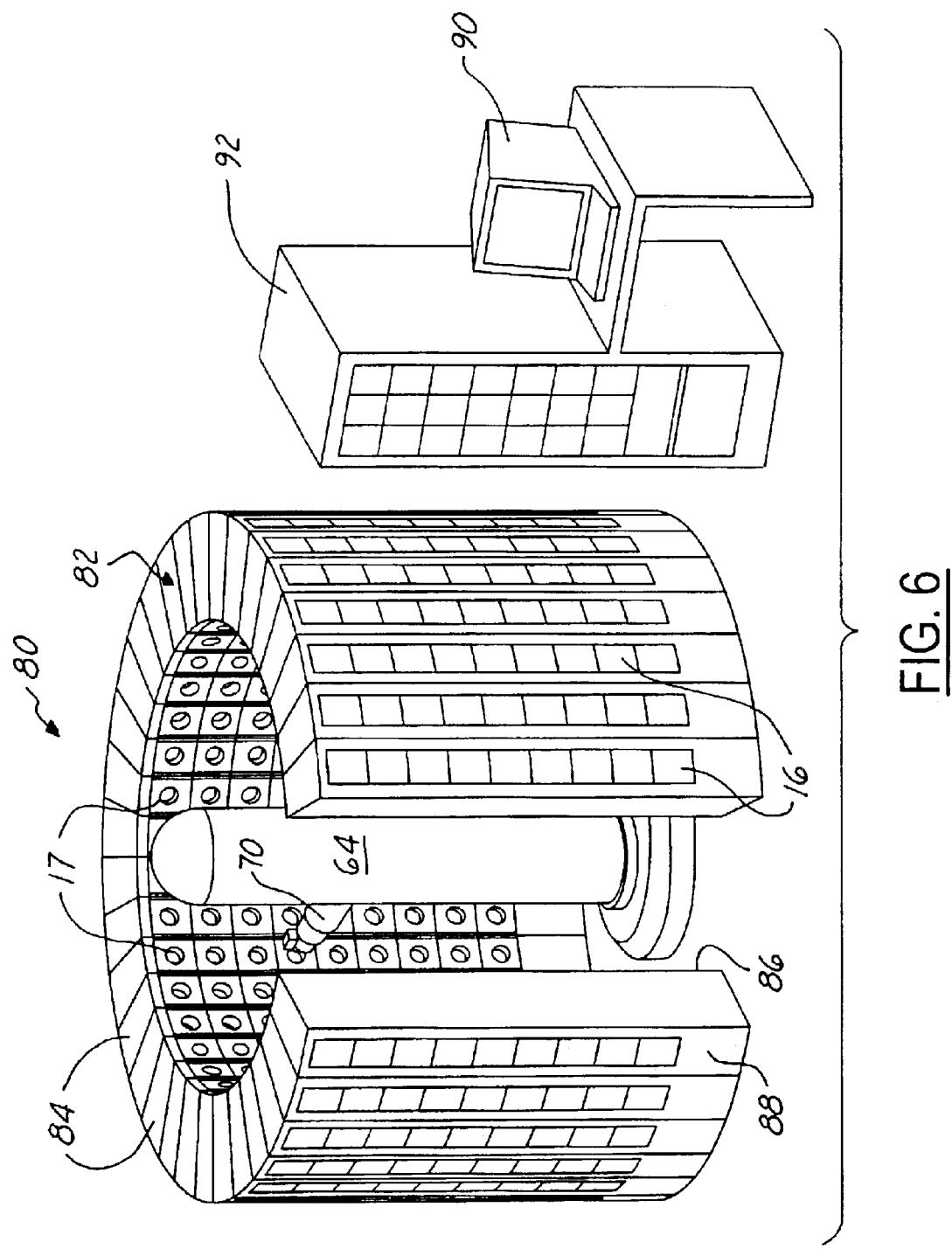
FIG. 6 illustrates a perspective view of an automated data library system in accordance with a second alternate embodiment of the present invention.

Referring now to FIG. 6, a perspective view of an automated data library system 80 in accordance with a second alternate embodiment of the present invention is shown. Automated data library system 80 includes a cylindrical-shaped or silo-type data library 82. Data library 82 includes un-powered and un-cooled cabinets 84 having an inner side 86 and an outer side 88. Drive clusters 16 are statically mounted in a three-dimensional arrangement within cabinets 84 of data library 82.

Robotic librarian 64 is positioned adjacent inner side 86 of data library 82 in order to engage and access drive clusters 16. In this second alternate embodiment, main body 68 of robotic librarian 64 is fixed in position on the surface upon which data library 82 rests. As described with reference to FIGS. 4–5, arm 70 extends into a port 17 of a drive cluster 16 in order for robotic librarian 64 to supply power and cooling air to the drive cluster and read data from (or write data to) the drive cluster. As such, arm 70 effectively enables robotic librarian 64 to move about data library 82 even though main body 68 is fixed in position. Robotic librarian 64 transmits the read data to a host server 90 using wired or wireless communications means.

Automated data library system 80 may further include a deep archival storage unit 92 for receiving those drive clusters 16 from data library 82 which are not likely to be utilized as much as other drive clusters.

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. An automated data library system comprising:

a data library having a housing;

a plurality of disk drive clusters statically mounted within respective areas of the housing of the data library, each disk drive cluster includes at least one disk drive array and each disk drive array includes at least one disk drive; and a robotic librarian operable for moving about the data library to locate a desired disk drive cluster, the robotic librarian having a reader for reading data stored on a disk drive of a disk drive cluster and a power source for providing power to a disk drive cluster to enable operation of the disk drive cluster, the robotic librarian being further operable for making a connection with the desired disk drive cluster, wherein the robotic librarian transfers power from the power source to the desired disk drive cluster via the connection for enabling operation of the desired disk drive cluster, wherein the robotic librarian reads data stored on a disk drive of the desired disk drive cluster with the reader via the connection while operation of the desired disk drive cluster is enabled.

2. The system of claim 1 wherein:

the robotic librarian further includes a cooling device for supplying air to cool off a disk drive cluster while operation of the disk drive cluster is enabled, wherein the robotic librarian supplies air from the cooling device to the desired disk drive cluster via the connection.

3. The system of claim 1 wherein:

the disk drive clusters each include a data communications port, wherein the connection between the robotic librarian and the desired disk drive cluster includes a connection between the robotic librarian and the data communications port of the desired disk drive cluster in order to enable the reader of the robotic librarian to read data stored on the desired disk drive cluster.

4. The system of claim 1 wherein:

the disk drive clusters each include a power port, wherein the connection between the robotic librarian and the desired disk drive cluster includes a connection between the robotic librarian and the power port of the desired disk drive cluster in order to enable the power source of the robotic librarian to provide power to the desired disk drive cluster.

5. The system of claim 1 wherein:

the disk drive clusters each include a port and the robotic librarian includes an arm, wherein the port of the desired disk drive cluster receives the arm of the robotic librarian in order for the robotic librarian to make the connection with the desired disk drive cluster.

6. The system of claim 1 wherein:

the connection between the robotic librarian and the desired disk drive cluster is an umbilical connection.

7. The system of claim 1 wherein:

the data library includes cabinets arranged in a book-shelf configuration, wherein the disk drive clusters are statically mounted within the cabinets of the data library.

8. The system of claim 1 wherein:

the data library includes cabinets arranged in a silo configuration, wherein the disk drive clusters are statically mounted within the cabinets of the data library.

9. An automated data library system comprising:

a data library having un-powered cabinets within a housing;

a plurality of disk drive clusters statically mounted within respective areas of the cabinets in the housing of the data library, each disk drive cluster includes at least one disk drive array and each disk drive array includes at least one disk drive; and a robotic librarian operable for moving about the data library to locate a desired disk drive cluster, the robotic librarian having at least one of a writer and a reader, the writer being operable for writing data to a disk drive of a drive cluster and the reader being operable for reading data from a disk drive of a drive cluster, the robotic librarian further having a power source for providing power to a disk drive cluster to enable operation of the disk drive cluster, the robotic librarian being further operable for physically engaging the desired disk drive cluster, wherein the robotic librarian transfers power from the power source to the desired disk drive cluster via the physical engagement for enabling operation of the desired disk drive cluster, wherein the robotic librarian is operable for using the writer to write data to a disk drive of the desired drive cluster over the physical connection while the desired disk drive cluster is powered, wherein the robotic librarian is operable for using the reader to read data from a disk drive of the desired disk drive cluster over the physical connection while the desired disk drive cluster is powered.

10. The system of claim 9 wherein:

the cabinets of the data library are un-cooled, the robotic librarian further including a cooling device for supplying air to cool off a disk drive cluster while operation of the disk drive cluster is powered, wherein the robotic librarian supplies air from the cooling device to the desired disk drive cluster while the desired disk drive cluster is powered.

11. The system of claim 9 wherein:

the disk drive clusters each include a data communications port, wherein the physical engagement between the robotic librarian and the desired disk drive cluster includes a connection between the robotic librarian and the data communications port of the desired disk drive cluster in order to enable writing data to and reading data from the desired disk drive cluster.

12. The system of claim 11 wherein:

the disk drive clusters each include a power port, wherein the physical engagement between the robotic librarian and the desired disk drive cluster includes a connection between the robotic librarian and the power port of the desired disk drive cluster in order to enable the power source of the robotic librarian to provide power to the desired disk drive cluster.

13. The system of claim 12 wherein:

the disk drive clusters each include a receiving canal and the robotic librarian includes an arm, wherein the receiving canal of the desired disk drive cluster receives the arm of the robotic librarian in order for the robotic librarian to connect with the data communications port and the power port of the desired disk drive cluster.

* * * * *